United States Patent
Ruiz Vega et al.

(10) Patent No.: US 11,421,121 B2
(45) Date of Patent: Aug. 23, 2022

(54) WATER-BASED INK COMPOSITION

(71) Applicant: TORRECID, S.A., Alcora (ES)

(72) Inventors: Óscar Ruiz Vega, Alcora (ES); Alejandro Forés Fernandes, Alcora (ES); Francisco Sanmiguel Roche, Alcora (ES)

(73) Assignee: TORRECID, S.A., Alcora (ES)

(*) Notice: Subject to any disclaimer, the term of this patent is extended or adjusted under 35 U.S.C. 154(b) by 369 days.

(21) Appl. No.: 16/753,492

(22) PCT Filed: Sep. 27, 2018

(86) PCT No.: PCT/ES2018/070624
§ 371 (c)(1),
(2) Date: Apr. 3, 2020

(87) PCT Pub. No.: WO2019/068946
PCT Pub. Date: Apr. 11, 2019

(65) Prior Publication Data
US 2020/0255681 A1   Aug. 13, 2020

(30) Foreign Application Priority Data
Oct. 4, 2017   (ES) .................. 201731178

(51) Int. Cl.
*C09D 11/322* (2014.01)
*C09D 11/38* (2014.01)
*B41J 2/04* (2006.01)
*C03C 8/14* (2006.01)

(52) U.S. Cl.
CPC ............ *C09D 11/322* (2013.01); *B41J 2/04* (2013.01); *C03C 8/14* (2013.01); *C09D 11/38* (2013.01)

(58) Field of Classification Search
CPC ...... B41J 2/04; B41J 2/21; C03C 8/14; C04B 41/80; C09D 11/033; C09D 11/322; C09D 11/38; C09D 11/40
See application file for complete search history.

(56) References Cited

U.S. PATENT DOCUMENTS

| | | |
|---|---|---|
| 2004/0233262 A1 | 11/2004 | Randler et al. |
| 2006/0229382 A1 | 10/2006 | Schweikart et al. |
| 2007/0176991 A1* | 8/2007 | Arai .............. C09D 11/38 106/31.77 |
| 2014/0345495 A1 | 11/2014 | Ahrens |
| 2017/0037272 A1* | 2/2017 | Nakano ............ C09D 11/107 |
| 2017/0182779 A1* | 6/2017 | Maeda ............. C09D 11/322 |

FOREIGN PATENT DOCUMENTS

| | | |
|---|---|---|
| EP | 2 918 560 A1 | 9/2015 |
| EP | 2 998 370 A1 | 3/2016 |
| WO | 2015/036812 A1 | 3/2015 |
| WO | 2016/042097 A1 | 3/2016 |

OTHER PUBLICATIONS

International Search Report for PCT/ES2018/070624 dated Feb. 4, 2019 (PCT/ISA/210).

* cited by examiner

*Primary Examiner* — Anh T Vo
(74) *Attorney, Agent, or Firm* — Sughrue Mion, PLLC

(57) ABSTRACT

The invention relates to a water-based ink composition for drop-on-demand (DoD) printing technology, which is intended for glazing and decorating ceramic products and provides colour or ceramic effects on ceramic supports once it has been fired at temperatures between 850° C. and 1280° C.

14 Claims, No Drawings

WATER-BASED INK COMPOSITION

The present invention falls within the field of drop-on-demand (DoD) inkjet printing inks, which provides chromatic or ceramic effects on ceramic supports once it has been fired at temperatures between 850° C. and 1280° C.

STATE OF THE ART

The decoration and glazing of ceramic products by means of inkjet printing is widely implemented at industrial level. In this regard, there are machines based on so-called drop-on-demand (DoD) inkjet printhead technology. DoD printing is characterised in that it uses printheads based on the use of piezoelectric elements with trigger frequencies which, depending on the printhead manufacturer, range between 0.05-300 KHz, the most well-known manufacturers of this type of printheads being the companies Dimatix (Fujifilm), Xaar, Seiko, KM and Ricoh, inter alia, to generate ink drops at picometric scale that flow out through a hole with a diameter no greater than 50 micrometres. The drops are expelled only as required, which is why they are called "on demand". An essential characteristic that must be met by inks applied by means of DoD technology is a particle size D50 at nanometric scale, in order to prevent the particles from blocking the printhead outlet holes. Another important peculiarity is the stability of the ink in the printing machine to achieve proper printing. This stability includes constant values of certain parameters such as viscosity, surface tension and drying speed. It is also important to highlight the absence of sedimentation of the solid nanometric particles, since it also causes blockage of the nozzles in the printheads and, therefore, absence of printing.

In the state of the art there are ink and ceramic glaze compositions based on this type of DoD digital printing technology. Thus, patent ES2257957 protects a water-free ink composed of inorganic materials and that, once deposited on the ceramic support and subjected to heat treatment, develops a colouration. Furthermore, the aforementioned patent ES2257957 describes the use of dispersing agents and stabilising agents soluble in the non-aqueous ink medium. Its main function consists of stabilising solid particles by keeping them suspended in the non-aqueous medium, thereby preventing the agglomeration and sedimentation thereof. However, these dispersing and stabilising agents are characterised in that they are not effective when particles (pigments, ceramic frits or ceramic raw materials) must be stabilised in an aqueous medium since, given their chemical nature, they are not solubilised in aqueous medium. The reason is because their solid particle stabilisation mechanism is based on a chemical structure capable of sterically interacting with the solid particle in the non-aqueous medium.

Furthermore, patent ES2468553 describes a digital glaze composition for ceramic tiles comprising a water-free liquid part, inorganic particles of ceramic frits and/or ceramic raw materials and at least one dispersing agent. Once again, the dispersing and wetting agents described in patent ES2468553 are characterised in that they are only effective in the steric stabilisation of particles in non-aqueous media and, therefore, are not viable in aqueous liquid media.

Also, worth noting is patent application P201631554, which describes a water-based ceramic glaze for application by means of digital technology other than Drop-on-Demand on ceramic supports. The main feature of this digital glaze is that, given that it is not intended to be applied by means of DoD technology, it comprises a high content of ceramic frits and/or ceramic raw materials (between 40% and 55% by weight) and a large particle size, comprising between 40 micrometres and 65 micrometres. In order to stabilise the high solid content and their large particle size, the patent application is characterised in that it specifically uses sodium chloride and/or sodium polyacrylate and/or potassium polyacrylate and/or an ethoxylated polyurethane. However, these compounds are only effective for formulations which, while water-based, have a high solid content with a particle size D100 greater than 40 micrometres.

DESCRIPTION OF THE INVENTION

Throughout the invention and claims, the word "comprises" and its variants do not intend to exclude other technical features, additives, components or steps. Furthermore, the word "comprises" includes the case "consists of". For persons skilled in the art, other objects, advantages and features of the invention may be partly inferred from the description and partly from the embodiment of the invention.

The term "ceramic support" as used herein relates to any flat or rough surface consisting of a mixture of clays and/or ceramic materials (ceramic frits, silicates, feldspars, oxides, etc.), formed by means of techniques commonly used in the ceramic industry such as pressing, lamination or extrusion, inter alia, which can be glazed or not glazed, unfired or subjected to a firing cycle. Examples of ceramic supports include, but are not limited to, ceramic tiles, roof tiles, bricks, crockery and sanitary ware.

The present invention is a water-based ink, whose liquid medium contains water in a minimum percentage of 20% by weight of the liquid phase, for inkjet printing by means of DoD technology intended for glazing or decorating ceramic supports. As opposed to the state of the art, which bases the stability of the nanoparticles for DoD technology on the use of non-aqueous solvents, without water content, and dispersing agents that stabilise by means of steric interaction, i.e., using the morphology of the dispersant molecule to prevent the agglomeration of nanoparticles; the present invention is capable of stabilising nanometric particles in aqueous media, among other aspects, through the use of specific additives, including the use of dispersing agents. These dispersing agents present in the water-based inks that are the object of the invention are capable of stabilising the nanoparticles through the combination of both electrostatic-type nanoparticle/dispersing agent interactions, i.e., neutralisation of charges between the dispersant molecule and the particle; and steric-type interactions. Only by combining both interactions is possible to achieve stable water-based inks for DoD technology and with proper behaviour during printing.

In turn, the ink of the present invention is characterised in that, once deposited on the ceramic support, provides chromatic or ceramic effects after a firing cycle at temperatures comprised between 850° C. and 1280° C.

The fact that the ink object of the invention comprises a water-based liquid medium, having a water content in a minimum percentage of 20% by weight of the liquid phase, implies an environmental improvement, since $CO_2$ emissions and other chemical compounds are reduced during the heat treatment with respect to the inks existing in the state of the art.

The present invention provides water-based ink applicable by means of DoD technology which comprises:

a. Water with a conductivity (k) of less than 50 μS/cm and in a percentage by weight comprised between 10% and 45%.

b. At least one solvent in a percentage by weight of ink comprised between 10% and 55%. This solvent or mixture of solvents is characterised in that it is completely soluble in water in all proportions.
c. At least one type of solid particle in a percentage by weight of ink comprised between 15% and 50%.
d. At least one dispersing agent that is completely soluble in the water-based liquid medium of the ink and in a percentage by weight of ink comprised between 1% and 25%.
e. At least one wetting agent in a percentage by weight of ink comprised between 0.05% and 1%.
f. At least one antifoaming agent in a percentage by weight of ink comprised between 0.01% and 1%.
g. At least one preservative in a percentage by weight of ink comprised between 0.05% and 1%.

In the formulation of inks for DoD inkjet technology, a series of properties must be defined to ensure the proper behaviour thereof. In this regard, the viscosity value in accordance with shear rate or derived from transversal deformation with respect to time, both when the water-based ink is practically idle (shear rate at 10 s$^{-1}$) and when it is in motion in the printing machine circuit (shear rate comprised between 100 s$^{-1}$ and 1000 s$^{-1}$). Shear rate is measured using an Anton Paar MCR 102 cone-plate-type rheometer. The measurement method consists of placing the water-based ink on a heatable, horizontal plate. Next, the cone drops and starts rotating, measuring torque. The viscosity value is calculated based on torque value at a certain temperature and shear rate. In this regard, the water-based ink object of the present invention is characterised in that it has the following viscosity values at 40° C. in accordance with shear rate:

Between 8 cP and 35 cP at 10 s$^{-1}$ of shear rate.
Between 8 cP and 35 cP at 100 s$^{-1}$ of shear rate.
Between 6 cP and 30 cP at 1000 s$^{-1}$ of shear rate.

In the field of inkjet printing inks, the centimetre-gram-system unit centipoise (cP) is normally used, wherein 1 cP equals 0.001 Pa·s in the International System of Units.

The solvents used in the ink that is the subject of the invention are characterised in that they are completely soluble in water in any proportion. The solvents are selected from the group comprising monoethylene glycol, monopropylene glycol, ethylene glycol propyl ether, ethylene glycol n-butyl ether, diethylene glycol, diethylene glycol methyl ether, diethylene glycol ethyl ether, diethylene glycol n-butyl ether, triethylene glycol, triethylene glycol methyl ether, triethylene glycol ethyl ether, triethylene glycol n-butyl ether, tripropylene glycol methyl ether, polyethylene glycol of a molecular weight equal to or less than 400 g/mol, 1,2,3-propanetriol and 1,5-pentanediol.

According to the present invention, the solid particle present in the water-based ink constitutes the solid phase of the ink and comprises, at least, either a ceramic pigment or a ceramic frit or a ceramic raw material or a mixture of the foregoing.

In a preferred embodiment of the present invention, the water-based ink comprises:
a. Water with a conductivity of less than 50 μS/cm and in a percentage by weight comprised between 10% and 45%.
b. At least one solvent in a percentage by weight of ink comprised between 10% and 55%. This solvent or mixture of solvents is characterised in that it is completely soluble in water in all proportions.
c. At least one ceramic pigment in a percentage by weight of ink comprised between 15% and 50% and with a particle size D50 of less than 500 nanometres.
d. At least one dispersing agent that is completely soluble in the water-based liquid medium of the ink and in a percentage by weight of ink comprised between 1% and 25%.
e. At least one wetting agent in a percentage by weight of ink comprised between 0.05% and 1%.
f. At least one antifoaming agent in a percentage by weight of ink comprised between 0.01% and 1%.
g. At least one preservative in a percentage by weight of ink comprised between 0.05% and 1%.

The term "ceramic pigment", as used in the present invention, refers to any synthetic or natural inorganic compound characterised in that it remains unalterable and provides a colouration to the ceramic support once deposited thereon and after carrying out the corresponding heat treatment. Examples of ceramic pigments include, but are not limited to, various crystalline structures such as zirconium silicate, olivine, sphene, spinels, perovskites, hematites, etc., as such or doped with cations such as, for example, praseodymium, vanadium, cobalt, iron, chromium, cerium, etc., iron oxide, titanium oxide, chromium oxide and cobalt oxide.

In another preferred embodiment of the present invention, the water-based ink comprises the use of at least one ceramic frit in the composition of the water-based ink. The particle size of the ceramic frit or frits is less than 650 nanometres expressed in D50 and has a thermal expansion coefficient comprised between $40 \times 10^{-7}$° C.$^{-1}$ and $80 \times 10^{-7}$° C.$^{-1}$ measured at 300° C. The ceramic frits can be made of, include, but are not limited to, natural or synthetic products such as oxides, silicates, carbonates, aluminosilicates, borates, etc., from calcium, silicon, zinc, bismuth, boron, potassium, zirconium, cerium, etc., or mixtures thereof.

Additionally, in another embodiment, the water-based ink may contain ceramic raw materials with a particle size D50 of less than 500 nanometres. The term "ceramic raw material" as used herein makes reference to any chemical compound other than ceramic frits and ceramic pigments which is directly incorporated to the composition of the water-based ink object of the invention. Examples of ceramic raw materials include, but are not limited to, sodium feldspar, potassium feldspar, lithium feldspar, alumina, kaolinite clays, illite clays, zirconium silicate, zinc oxide, tungsten oxide, dolomite, kaolin, quartz, barium oxide, mullite, bentonite, wollastonite, tin oxide, nepheline, bismuth oxide, boron oxide, colemanite, calcium carbonate, aluminium phosphate, manganese oxide, spodumene, talc, magnesium oxide, cristobalite, rutile and anatase.

Likewise, in another preferred embodiment of the present invention, the water-based ink comprises:
a. Water with a conductivity of less than 50 μS/cm and in a percentage by weight comprised between 10% and 45%.
b. At least one solvent in a percentage by weight of ink comprised between 10% and 55%. This solvent or mixture of solvents is characterised in that it is completely soluble in water in all proportions.
c. At least one ceramic frit and at least one ceramic raw material in a percentage by weight of ink comprised between 15% and 50%. The ceramic frit has a particle size D50 of less than 650 nanometres and the ceramic raw material has a particle size D50 of less than 500 nanometres.
d. At least one dispersing agent that is completely soluble in the water-based liquid medium of the ink and in a percentage by weight of ink comprised between 1% and 25%.

e. At least one wetting agent in a percentage by weight of ink comprised between 0.05% and 1%.

f. At least one antifoaming agent in a percentage by weight of ink comprised between 0.01% and 1%.

g. At least one preservative in a percentage by weight of ink comprised between 0.05% and 1%.

Given that the solid particles present in the water-based inks object of the invention are characterised by having a small particle size and a solid content of up to 50% by weight of ink, one of the most important aspects for achieving the proper stability is the selection of the dispersing agent or dispersing agents present in the formulation. In this regard, the water-based ink object of the invention has the advantage over the state of the art that the dispersing agent or mixture of dispersing agents is completely soluble in the aqueous liquid medium of the ink and has optimal interaction with the particles to be stabilised, preventing the sedimentation thereof. In this regard, the dispersing agent that is completely soluble in the liquid part of the ink is selected from the group comprising polyacrylate salt, acrylate copolymer, high molecular weight acrylic copolymer, alkoxides, non-ionic modified fatty acid derivatives, carboxylic acid salt, phosphoric polyether and polycarboxylic acid salt.

The present invention also comprises the use of at least one wetting agent which is capable of acting properly in an aqueous medium and with the particle sizes and their concentrations inherent to the water-based ink that is the subject of the invention. In this regard, the wetting agent is selected from the group comprising a mixture of ethers with polyethylene-polypropylene glycol with monobenzyl ether and C8-C10 alcohols, polysiloxane polyether copolymer and non-ionic surfactants.

It should also be noted that the water-based ink object of the invention is introduced in a digital printing machine and is in continuous motion in the printing circuit. Consequently, foam and bubbles are generated. The presence of foam or bubbles is a major problem when printing with DoD technology since the inkjet printhead injects air instead of ink, which gives rise to a defect in the final application. Therefore, the present invention also comprises at least one antifoaming agent that is selected from the group comprising modified silicones, polydimethylsiloxanes, mineral oil derivatives and fatty derivatives.

As opposed to the digital inks and glazes of the state of the art, the high water content of the inks object of the invention makes it necessary to incorporate preservatives that prevent the growth of bacteria and other types of microorganisms that degrade the composition. Therefore, the water-based ink of the present invention comprises at least one preservative that is selected from the group comprising a mixture of 1,2-benzisothiazol-3-one and 1,2-benzisothiazol-3(2H)-one, 2-methyl-2H-isothiazol-3-one, bronopol, sodium pyrithione and tetramethylol acetylenediurea.

Another important property of the ink is the surface tension, since it determines its behaviour in the face plate of the inkjet printhead. In this regard, the water-based ink of the present invention has a surface tension value comprised between 20 mN/m and 40 mN/m.

Given that the ink contains water, it is of special importance to adjust its evaporation when inside the DoD digital printing machine, since it would cause the ink to dry out in the inkjet printhead nozzles and, therefore, clog them. To this end, the water-based ink object of the invention is characterised in that it has an evaporation rate of less than 35% when heated at 50° C. for 240 minutes. Evaporation rate is a term widely used in the formulation of digital inks of the ceramic industry to define the loss of weight of a composition at a certain temperature and time. Specifically, in the present invention evaporation rate has been determined through the thermogravimetry method, using for such purpose a Netzsch STA409 thermogravimetry machine. The machine contains a base on which a receptacle containing the sample to be measured is deposited. To this end, the receptacle without the sample is previously placed on the base and the thermobalance is tared to deduct the mass of the receptacle. Next, a known mass (m0) of the sample to be measured is added to the receptacle. The machine automatically weighs the mass mO. Next, the machine is heated at 50° C. without the presence of the receptacle with the sample. Once it reaches 50° C., the receptacle with the sample is deposited and left at said temperature for 240 minutes. The machine records the loss of mass during that time (m1). Lastly, evaporation rate is calculated according to the equation:

$$\text{Evaporation rate} = \frac{(m0 - m1)}{m0} \times 100(\%)$$

PREFERRED EMBODIMENTS

The following examples are provided by way of illustration and are not intended to limit the present invention. Furthermore, the present invention covers all possible combinations of particular and preferred embodiments indicated herein.

Example 1. Water-Based Ink with Chromatic Effect

Six water-based inks according to the present invention were prepared that enable the development of the colours cyan (ink 1), brown (ink 2), pink (ink 3), yellow (ink 4), black (ink 5) and white (ink 6). The compositions of the inks are expressed as a percentage by weight as shown in the following table:

|  |  | 1 | 2 | 3 | 4 | 5 | 6 |
|---|---|---|---|---|---|---|---|
| Water | Water | 19.1 | 28.3 | 25 | 23 | 27 | 28.85 |
| 1,2,3-propanetriol | Solvent | 35.1 | 26.25 |  |  | 5 | 12.75 |
| Triethylene glycol | Solvent | 10 |  |  |  |  | 2.5 |
| Triethylene glycol methyl ether | Solvent |  | 2.5 | 19.4 | 22.5 | 10.65 |  |
| Polyethylene glycol (200 g/mol) | Solvent |  | 2.5 |  |  |  | 10 |
| Polyethylene glycol (400 g/mol) | Solvent |  |  | 16.25 | 20 | 7 |  |
| Cyan ceramic pigment | Solid particle | 21 |  |  |  |  |  |

-continued

|  |  | 1 | 2 | 3 | 4 | 5 | 6 |
|---|---|---|---|---|---|---|---|
| Brown ceramic pigment | Solid particle |  | 32 |  |  |  |  |
| Pink ceramic pigment | Solid particle |  |  | 25 |  |  |  |
| Yellow ceramic pigment | Solid particle |  |  |  | 24 |  |  |
| Black ceramic pigment | Solid particle |  |  |  |  | 38 |  |
| ZrSiO$_4$ | Solid particle |  |  |  |  |  | 39 |
| High molecular weight acrylic copolymer | Dispersing agent |  |  |  |  | 3 |  |
| Polyacrylate salt | Dispersing agent | 0.25 | 6 | 8 | 6 | 3 | 3.5 |
| Non-ionic modified fatty acid derivative | Dispersing agent | 14 |  | 6 | 2 |  |  |
| Phosphoric polyether | Dispersing agent |  | 1.7 |  | 2 | 6 | 3 |
| Mixture of ethers with polyethylene-polypropylene glycol with monobenzyl ether and C8-C10 alcohols | Wetting agent | 0.30 |  |  |  | 0.15 | 0.15 |
| Polysiloxane polyether copolymer | Wetting agent |  |  | 0.5 | 0.35 |  |  |
| Non-ionic surfactant | Wetting agent |  |  |  | 0.15 |  |  |
| Modified silicone | Anti-foaming agent | 0.15 |  | 0.1 |  | 0.05 |  |
| Polydimethylsiloxane | Anti-foaming agent |  | 0.15 |  | 0.1 | 0.05 | 0.15 |
| Mixture of 1,2-benzisothiazol-3-one and 1,2-benzisothiazol-3(2H)-one, 2-methyl-2H-isothiazol-3-one | Preservative | 0.1 | 0.1 | 0.1 | 0.05 | 0.1 | 0.1 |

The properties of each of the water-based inks are indicated below.

| Properties | 1 | 2 | 3 | 4 | 5 | 6 |
|---|---|---|---|---|---|---|
| Viscosity (40° C.) at 10 s$^{-1}$ (cP) | 22.0 | 13.0 | 19.1 | 22.1 | 12.0 | 12.3 |
| Viscosity (40° C.) at 100 s$^{-1}$ (cP) | 20.4 | 11.5 | 17.4 | 21.3 | 11.3 | 10.2 |
| Viscosity (40° C.) at 1000 s$^{-1}$ (cP) | 18.5 | 10.1 | 15.8 | 18.5 | 10.1 | 9.1 |
| Surface tension (mN · m) | 35 | 28 | 27 | 30 | 35 | 35 |
| Evaporation rate (50° C., 240 minutes) (%) | 21.3 | 29.4 | 27.6 | 27.4 | 29.1 | 30.5 |

Water-based inks 1, 2, 3, 4, 5 and 6 were applied using a DoD inkjet printing machine on unfired ceramic tiles glazed with glossy and matte glazes for porous single firing, unfired ceramic tiles glazed with glossy and matte glazes for porcelain tile, unfired roof tiles glazed with glossy glaze and unfired crockery glazed with glossy glaze. Next, each product decorated with the water-based inks was subjected to a firing cycle. In all cases, products with fully integrated chromatic decoration and with the proper technical and aesthetic features required for each product were obtained.

EXAMPLE 2. Water-Based Ink with Ceramic Effect

Four water-based inks according to the present invention were prepared that enable the development of matte ceramic effects for porous single firing (ink 7), semi-opaque effect for porcelain tiles (ink 8), glossy effect (ink 9) for porcelain tiles and matte effect for porcelain tiles (ink 10). The compositions of the inks are expressed as a percentage by weight as shown in the following table:

|  |  | 7 | 8 | 9 | 10 |
|---|---|---|---|---|---|
| Water | Water | 28.05 | 33.73 | 25 | 27.91 |
| 1,2,3-propanetriol | Solvent | 23.75 | 21.05 |  | 9 |
| Triethylene glycol | Solvent | 5 | 5 | 12.5 |  |
| Triethylene glycol methyl ether | Solvent |  |  | 17.5 | 3 |
| Polyethylene glycol (200 g/mol) | Solvent | 6 |  |  |  |
| Polyethylene glycol (400 g/mol) | Solvent |  |  | 7.5 | 8 |
| 1,5-pentanediol | Solvent |  |  |  | 2.8 |
| Porous matte ceramic frit (CDT = 59 × 10$^{-7}$ ° C.$^{-1}$ at 300° C.) | Solid particle |  | 27 |  |  |
| Glossy ceramic frit (CDT = 62 × 10$^{-7}$ ° C.$^{-1}$ at 300° C.) | Solid particle |  |  | 23 |  |

-continued

| | | 7 | 8 | 9 | 10 |
|---|---|---|---|---|---|
| Quartz | Solid particle | 3.5 | 8.20 | | 4.49 |
| Al$_2$O$_3$ | Solid particle | 0.5 | 1.75 | | 6.28 |
| Potassium feldspar | Solid particle | 1 | | | |
| Sodium feldspar | Solid particle | | | 7.82 | 15.66 |
| ZrSiO$_4$ | Solid particle | | 14.4 | | |
| Wollastonite | Solid particle | | | 8.9 | 15.66 |
| High molecular weight acrylic copolymer | Dispersing agent | 1.5 | 2 | | 4.25 |
| Polyacrylate salt | Dispersing agent | 2.25 | 5 | 3 | |
| Non-ionic modified fatty acid derivative | Dispersing agent | | | | 1.5 |
| Polymeric alkoxide | Dispersing agent | | | 1 | |
| Mixture of ethers with polyethylene-polypropylene glycol with monobenzyl ether and C8-C10 alcohols | Wetting agent | 1 | 0.25 | | |
| Polysiloxane polyether copolymer | Wetting agent | | | 0.5 | 0.5 |
| Non-ionic surfactant | Wetting agent | | 0.1 | 0 | 0.4 |
| Modified silicone | Anti-foaming agent | 0.15 | 0.1 | | 0.3 |
| Polydimethylsiloxane | Anti-foaming agent | | 0.1 | 0.5 | |
| Mixture of 1,2-benzisothiazol-3-one and 1,2-benzisothiazol-3 (2H)-one, 2-methyl-2H-isothiazol-3-one | Preservative | 0.1 | | 0.05 | |
| Bronopol | Preservative | | | 0.05 | 0.25 |
| Water-soluble colourant | Colourant | 0.2 | 0.5 | 0.5 | |

The properties of each of the water-based inks are indicated below.

| Properties | 7 | 8 | 9 | 10 |
|---|---|---|---|---|
| Viscosity (40° C.) at 10 s$^{-1}$ (cP) | 18.3 | 14.3 | 20.5 | 17.3 |
| Viscosity (40° C.) at 100 s$^{-1}$ (cP) | 16.8 | 12.8 | 19.2 | 15.1 |
| Viscosity (40° C.) at 1000 s$^{-1}$ (cP) | 15.2 | 11.3 | 18.3 | 14.6 |
| Surface tension (mN/m) | 30.3 | 29.2 | 27.5 | 32.2 |
| Evaporation rate (50° C., 240 minutes) (%) | 29.55 | 35.68 | 28.15 | 30.25 |

Water-based ink 7 was applied using a DoD inkjet printing machine on a unfired and engobed porous single firing support and followed by a thermal cycle at a maximum temperature of 1140° C., obtaining a glaze with a matte effect generated by water-based ink 7.

Water-based ink 8 was applied using a DoD inkjet printing machine on a unfired and glazed porcelain support with a glossy glaze and followed by a heat treatment at a maximum temperature of 1195° C., obtaining a porcelain ceramic tile with glossy glaze and, on top of it, a semi-opaque effect generated by water-based ink 8.

Water-based ink 9 was applied using a DoD inkjet printing machine on a unfired and engobed porcelain support and followed by a heat treatment at a maximum temperature of 1195° C., obtaining a porcelain ceramic tile with a glossy effect glaze generated by water-based ink 9.

Water-based ink 10 was applied using a DoD inkjet printing machine on a unfired and engobed porcelain support and followed by a thermal cycle at a maximum temperature of 1195° C., obtaining a glaze with a matte effect generated by water-based ink 10.

The invention claimed is:

1. A water-based ink composition applicable by means of drop-on-demand (DoD) inkjet printing technology of the type which is followed by heat treatment after printing comprising:
   a. Water with a conductivity of less than 50 μS/cm and in a percentage by weight comprised between 10% and 45%.
   b. At least one completely water-soluble solvent in a percentage by weight of ink comprised between 10% and 55%.
   c. At least one type of solid particle in a percentage by weight of ink comprised between 15% and 50%.
   d. At least one dispersing agent that is completely soluble in the water-based liquid medium of the ink and in a percentage by weight of ink comprised between 1% and 25%.
   e. At least one wetting agent in a percentage by weight of ink comprised between 0.05% and 1%.
   f. At least one antifoaming agent in a percentage by weight of ink comprised between 0.01% and 1%.
   g. At least one preservative in a percentage by weight of ink comprised between 0.05% and 1%.

2. The water-based ink composition, according to claim 1, wherein the viscosity values at 40° C. in accordance with shear rate are:
   a. between 8 cP and 35 cP at 10 s$^{-1}$ of shear rate.
   b. between 8 cP and 35 cP at 100 s$^{-1}$ of shear rate.
   c. between 6 cP and 30 cP at 1000 s$^{-1}$ of shear rate.

3. The water-based ink composition, according to claim 1, wherein the water-soluble solvents are selected from the group comprising monoethylene glycol, monopropylene glycol, ethylene glycol propyl ether, ethylene glycol n-butyl ether, diethylene glycol, diethylene glycol methyl ether, diethylene glycol ethyl ether, diethylene n-butyl ether, triethylene glycol, triethylene glycol methyl ether, triethylene glycol ethyl ether, triethylene glycol n-butyl ether, tripropylene glycol methyl ether, polyethylene glycol of a molecular weight equal to or less than 400 g/mol, 1,2,3-propanetriol and 1,5-pentanediol.

4. The water-based ink composition, according to claim 1, wherein the solid particle is a ceramic pigment.

5. The water-based ink composition, according to claim 4, wherein the ceramic pigment has a particle size D50 of less than 500 nanometres.

6. The water-based ink composition, according to claim 1, wherein the solid particle is a ceramic frit.

7. The water-based ink composition, according to claim 6, wherein the ceramic frit has a particle size D50 of less than 650 nanometres and a thermal expansion coefficient comprised between $40 \times 10^{-7}$ °C.$^{-1}$ and $80 \times 10^{-7}$ °C.$^{-1}$ at 300° C.

8. The water-based ink composition, according to claim 1, wherein the solid particle is a ceramic raw material.

9. The water-based ink composition, according to claim 8, wherein the ceramic raw material has a particle size D50 of less than 500 nanometres and is selected from the group comprising $Al_2O_3$, quartz, ZnO, $WO_3$, $Fe_2O_3$, $ZrSiO_4$, sodium feldspar, potassium feldspar, lithium feldspar, nepheline, mullite, wollastonite, kaolinite clay, illite clay, bentonites.

10. The water-based ink composition, according to claim 1, wherein the dispersing agent which is completely soluble in the liquid part of the ink is selected from the group comprising polyacrylate salt, acrylate copolymer, high molecular weight acrylic copolymer, alkoxides, non-ionic modified fatty acid derivatives, carboxylic acid salt, phosphoric polyether and polycarboxylic acid salt.

11. The water-based ink composition, according to claim 1, wherein the wetting agent is selected from the group comprising a mixture of ethers with polyethylene-polypropylene glycol with monobenzyl ether and C8-C10 alcohols, polysiloxane polyether copolymer and non-ionic surfactants.

12. The water-based ink composition, according to claim 1, wherein the antifoaming agent is selected from the group comprising modified silicones, polydimethylsiloxanes, mineral oil derivatives and fatty derivatives.

13. The water-based ink composition, according to claim 1, wherein the preservative is selected from the group comprising a mixture of 1,2-benzisothiazol-3-one and 1,2-benzisothiazol-3(2H)-one and 2-methyl-2H-isothiazol-3-one, bronopol, sodium pyrithione and tetramethylol acetylenediurea.

14. The water-based ink composition, according to claim 1, characterised in that it also contains other additives soluble in the liquid part of the ink which are selected from the group comprising colourants and corrosion inhibitors.

* * * * *